(12) United States Patent
Altomonte

(10) Patent No.: US 7,724,129 B2
(45) Date of Patent: May 25, 2010

(54) MULTIPLE COLOR POINTER FOR A GAUGE OR INSTRUMENT

(75) Inventor: John G. Altomonte, Clinton Township, MI (US)

(73) Assignee: DENSO International America, Inc., Southfield, MI (US)

( * ) Notice: Subject to any disclaimer, the term of this patent is extended or adjusted under 35 U.S.C. 154(b) by 395 days.

(21) Appl. No.: 11/714,992

(22) Filed: Mar. 7, 2007

(65) Prior Publication Data
US 2008/0218326 A1 Sep. 11, 2008

(51) Int. Cl.
*G08B 3/00* (2006.01)
*G08B 5/00* (2006.01)
*G08B 7/00* (2006.01)
*G01D 11/28* (2006.01)

(52) U.S. Cl. .................. 340/461; 362/29; 340/815.4
(58) Field of Classification Search .......... 340/461, 340/815.86
See application file for complete search history.

(56) References Cited

U.S. PATENT DOCUMENTS

| | | | |
|---|---|---|---|
| 4,300,470 A | 11/1981 | Furukawa | |
| 4,625,262 A | 11/1986 | Sakakibara et al. | |
| 4,860,170 A | 8/1989 | Sakakibara et al. | |
| 5,142,453 A | 8/1992 | Ohta et al. | |
| 5,174,238 A | 12/1992 | Ohike | |
| 5,320,062 A | 6/1994 | Masuda et al. | |
| 5,320,063 A | 6/1994 | Ogura et al. | |
| 5,878,689 A | 3/1999 | Sugita | |
| 6,004,001 A * | 12/1999 | Noll | 362/30 |
| 6,070,549 A | 6/2000 | Iuchi et al. | |
| 6,302,551 B1 * | 10/2001 | Matumoto | 362/27 |
| 6,441,746 B1 | 8/2002 | Taborisskiy et al. | |
| 6,693,523 B1 * | 2/2004 | Noll et al. | 340/461 |
| 6,778,095 B2 * | 8/2004 | Lo | 340/815.78 |
| 6,820,991 B2 * | 11/2004 | Wakaki et al. | 362/27 |
| 6,827,034 B1 | 12/2004 | Paulo | |
| 6,863,411 B2 | 3/2005 | Furuya | |
| 6,955,438 B2 * | 10/2005 | Ishii | 362/29 |
| 6,979,094 B1 | 12/2005 | Venkatram | |
| 6,983,717 B1 | 1/2006 | Fong | |

(Continued)

FOREIGN PATENT DOCUMENTS

EP 1445776 A1 * 8/2004

(Continued)

*Primary Examiner*—Benjamin C Lee
*Assistant Examiner*—Cal Eustaquio
(74) *Attorney, Agent, or Firm*—Harness, Dickey & Pierce, PLC

(57) ABSTRACT

An indicating instrument such as a gauge may employ a light source, a face plate located in front of the light source, and a pointer that is rotatably mounted adjacent the face plate to indicate face plate positions. The pointer may be configured to emit at least two colors of light from a single color light source. The pointer may have a bottom surface, and a top surface that defines a channel to create lands on two levels. The top lands and bottom pointer surface may be equipped with hot-stamp foils of chosen colors to reflect or emit different colors of light from the pointer. A bottom foil may reflect light through the pointer while a top foil may emit light of a chosen color. The pointer shaft may be molded from a light-transmitting plastic material such as acrylic or polycarbonate.

9 Claims, 3 Drawing Sheets

U.S. PATENT DOCUMENTS

| | | |
|---|---|---|
| 7,066,630 B1 | 6/2006 | Venkatram |
| 7,163,303 B1 | 1/2007 | Venkatram |
| 7,178,478 B1 * | 2/2007 | Fong et al. ............... 116/288 |
| 2004/0155789 A1 * | 8/2004 | Crews ............... 340/815.86 |

FOREIGN PATENT DOCUMENTS

| | | |
|---|---|---|
| JP | 2000162000 | 3/2000 |
| JP | 2002098560 | 4/2002 |

* cited by examiner

MULTIPLE COLOR POINTER FOR A GAUGE OR INSTRUMENT

FIELD OF THE INVENTION

The present disclosure relates to an illuminated pointer for an indicating instrument, such as a gauge; more specifically, the disclosure relates to a pointer that emits multiple colors.

BACKGROUND OF THE INVENTION

The statements in this section merely provide background information related to the present disclosure and may not constitute prior art. Gauges are utilized within industries to display a value of a parameter being monitored by the gauge. In the automotive industry, gauges may be displayed as part of the instrument panel or dashboard for indicating information pertaining to the operating conditions of a vehicle. These gauges include, but are not limited to, speedometers, tachometers, engine coolant temperature, engine oil temperature, fuel level, oil pressure, battery voltage and the like. The gauges may include an analog face for displaying a valve of a monitored parameter. More specifically, an analog gauge may include a face plate having indicia thereon such as numbers, letters or indicators and an illuminated pointer that rotates to the indicia to indicate the level of the parameter. While current analog indicating instruments with illuminated pointers have generally proven satisfactory for their intended purposes, each has been associated with its share of limitations.

One such limitation of current illuminated pointers is that they are currently capable of being illuminated in only one color at a time. In a world of driving where increasing road speeds require gauges to be read with increased eye speed, a multiple color pointer may permit such gauge to be focused upon and read more quickly. Another limitation of current illuminated pointers is that utilizing a single color light source to concurrently achieve multiple colors of emitted light from the pointer is unachievable. Related to the single color light source problem is how to leave current gauge structure and methods largely unaltered while achieving a pointer that emits multiple colors.

What is needed then is a device that does not suffer from the above limitations. This, in turn, will provide a gauge pointer that is capable of being illuminated simultaneously in multiple colors while largely maintaining current gauge structure and a single color light source.

SUMMARY

A viewed component of a vehicle instrument cluster may include a gauge defining a dial and an indicator, such as a pointer, rotatably mounted through a face plate to indicate face plate positions on the dial. In one configuration, the pointer may have a top surface defining a channel, which essentially defines a first land and a second land. A bottom surface of the pointer may have a foil layer applied to it to reflect light through the pointer. Additionally, the first land and the second land may have a foil material applied to them to reflect light and/or emit a colored light from the pointer.

In another configuration, the indicating instrument may have a reflective material applied to its bottom surface, a first zone of a first color plastic, and a second zone of a second color plastic. The application of light through the pointer may cause the first color plastic to emit a first color light from the first zone and the second color plastic to emit a second color light from the second zone.

In yet another configuration, the indicating instrument may have a bottom surface defining a channel, which essentially defines a first land and a second land on the bottom surface of the pointer, and a reflective material, such as a hot-stamped foil, applied to a bottom surface of at least two of a first, second and third zones. The application or direction of light through the pointer may cause the first color plastic to emit a first color light from the first zone and the second color plastic to emit a second color light from the second zone.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 4b is a perspective view of the pointer of FIG. 4a;

FIG. 5b is a perspective view of the pointer of FIG. 5a;

FIG. 6b is a perspective view of the pointer of FIG. 6a.

DETAILED DESCRIPTION

Figure 1:
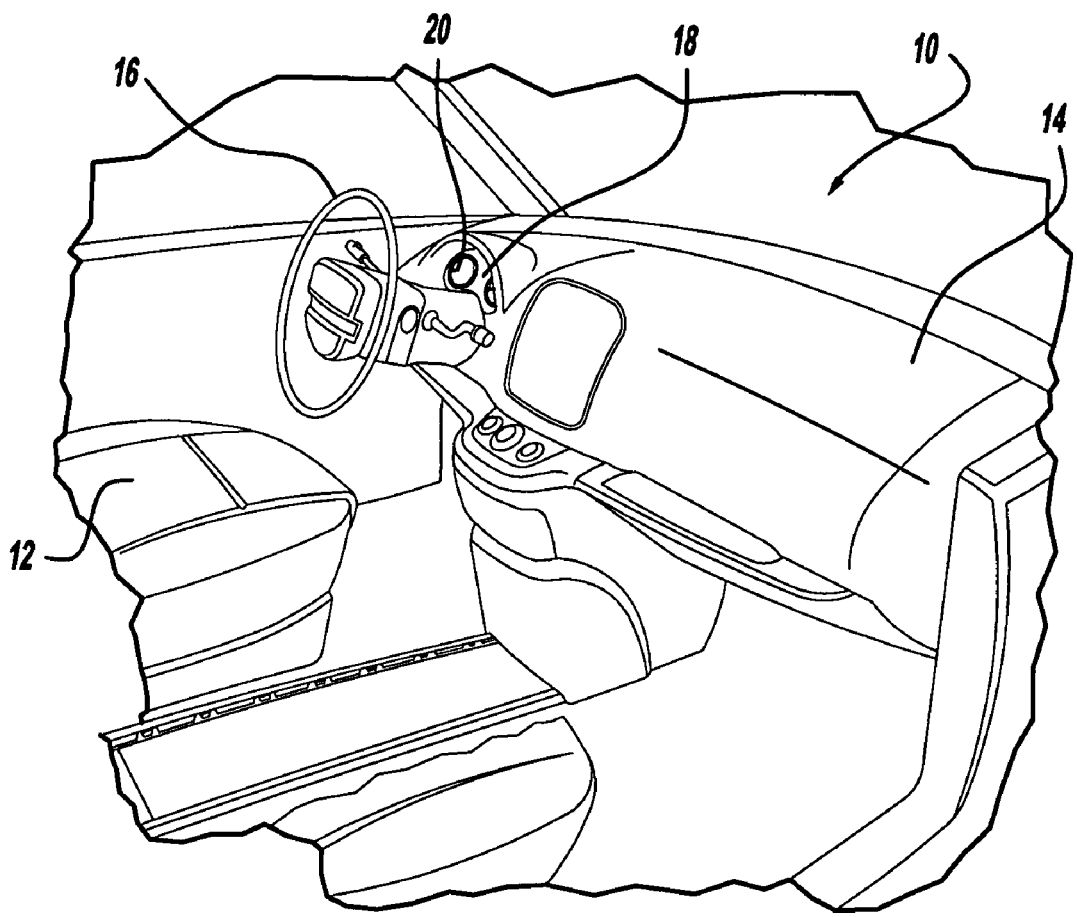
FIG. 1 is a perspective view of an exemplary interior vehicle cabin having an instrument cluster including a vehicle gauge.

The following description is merely exemplary in nature and is not intended to limit the present disclosure, application, or uses. It should be understood that throughout the drawings, corresponding reference numerals indicate like or corresponding parts and features.

FIG. 1 depicts a typical interior 10 of an automotive vehicle. The interior 10 includes a driver's seat 12, a dashboard 14, a steering wheel 16, and an instrument cluster 18. While FIG. 1 depicts such components resident in a left-hand drive vehicle, the present teachings may also be applied to right-hand drive vehicles.

The instrument cluster 18 typically includes numerous indicating instruments, such as gauges, an example of which is a speedometer. Hereinafter, a speedometer will be used as the representative gauge employing an illuminated pointer; however, it is to be understood that any other gauge including, but not limited to, a tachometer, an engine coolant temperature gauge, an engine oil temperature gauge, a fuel gauge, an oil pressure gauge, and the like may also be equipped with the teachings of the present invention.

Figure 2:
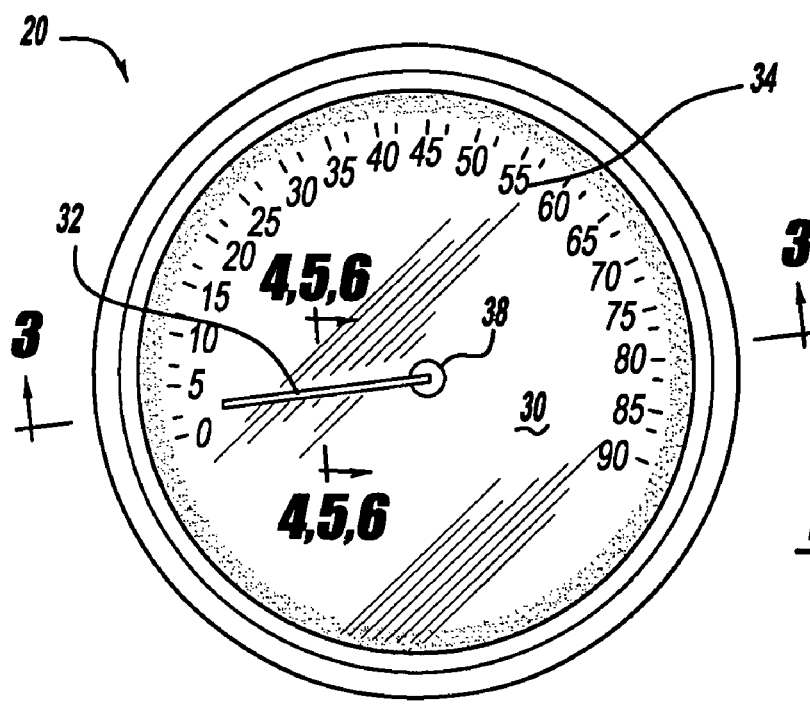
FIG. 2 is a front view of a vehicle gauge in accordance with teachings of the present invention.
Figure 3:
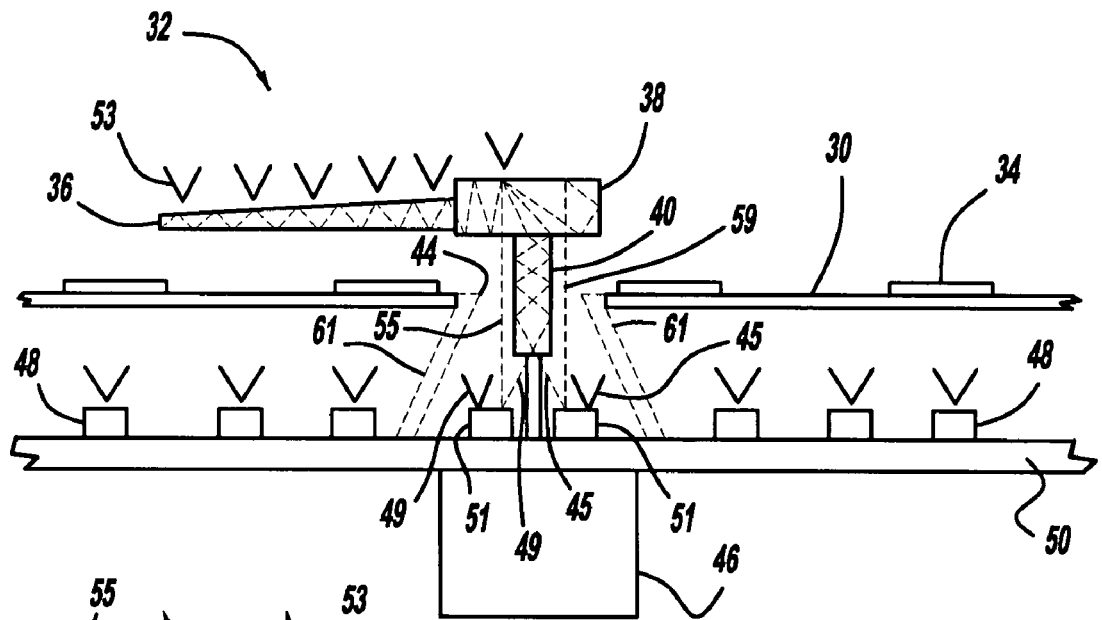
FIG. 3 is a side view of a vehicle gauge in accordance with the teachings of the present invention.

Referring now to FIGS. 2 and 3, the speedometer 20 will be described in greater detail. The speedometer 20 may have a face plate 30 and a pointer assembly 32. The face plate 30 may be in the form of a circular disk and include numerous indicators or indicia 34 located along an outer circumferential area. The indicia 34 may be arranged in ascending order to indicate speeds of a vehicle in miles per hour, kilometers per hour or both.

With further reference to FIG. 3, the pointer assembly 32 may define a generally longitudinal pointer 36 extending from a hub 38. The hub 38 may have a shaft 40 attached to it or integrally molded to the hub as a single piece. The shaft 40 may extend through a hole 44 in the face plate 30 and may be coupled to a motor 46 in order to rotate the pointer assembly 32 and pointer 36 to various indicia 34 about the dial face 30. In one example, the pointer assembly 32 may be a light transmitting plastic material such as polycarbonate or acrylic. However, regardless of the material used, the pointer assembly 32, may be clear or colored, and translucent. It is within the scope of the present invention to have the generally longitudinal portion 36 of the pointer assembly 32 be any shape which can indicate the speed of the vehicle yet transmit and emit light.

Continuing with FIG. 3, a light source 48, such as a light emitting diode ("LED"), may mount to and extend from a printed circuit board 50 ("PCB") to supply light to the pointer assembly 32. More specifically, light from the LEDs may be directed into the pointer shaft 40, also known as a "light pick-up" or "pick-up." Alternatively, light from the LEDs may be directed directly into the hub 38 and then into the pointer 36. The LEDs that illuminate the pointer 36 may be dedicated to lighting the pointer 36 and pointer assembly 32 or they may play a dual role of also lighting the indicia 34 on the face plate 30. As a representative example, light 45 from an LED 47 or light 49 from an LED 51 may be emitted toward and then into the shaft 40. As the representative example, the light 45 passes into and through the shaft 40 and into the hub 38. From the hub 38, light is reflected into the pointer 36 where it may pass out the top surface of the pointer 36, as indicated by light 53.

In an alternate arrangement, using LEDs 51 as an example, light 55, 59 may be directed directly into the hub 38 and subsequently into the pointer 36 and therefore, light 55, 59 may bypass shaft 40. In such an arrangement, the LEDs 51 may be kept separate from other LEDs of the PCB 50, such as LEDs 48, by using a wall 61. When the wall 61 is not present, the light 55, 59 serves a dual purpose by illuminating the pointer, and indicia and graduations in the face plate 30. Further details of embodiments of pointers in accordance with the present teachings will now be presented.

Figure 4A:
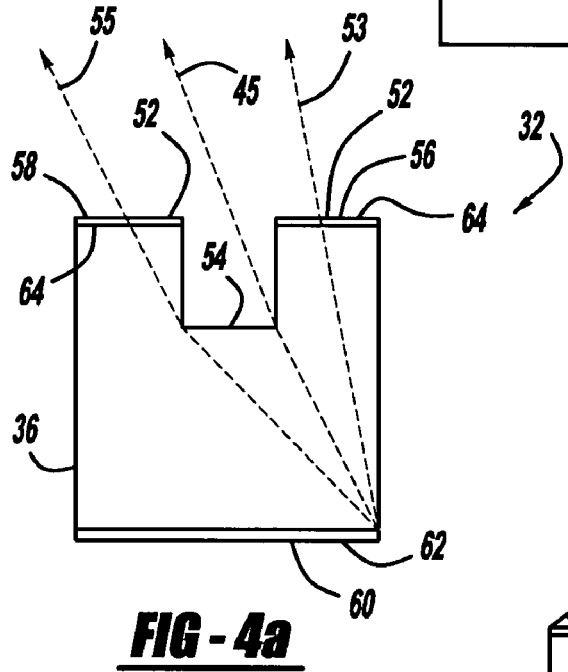
FIG. 4a is a cross-sectional view of the pointer of FIG. 2 taken along line 4-4.
Figure 4B:
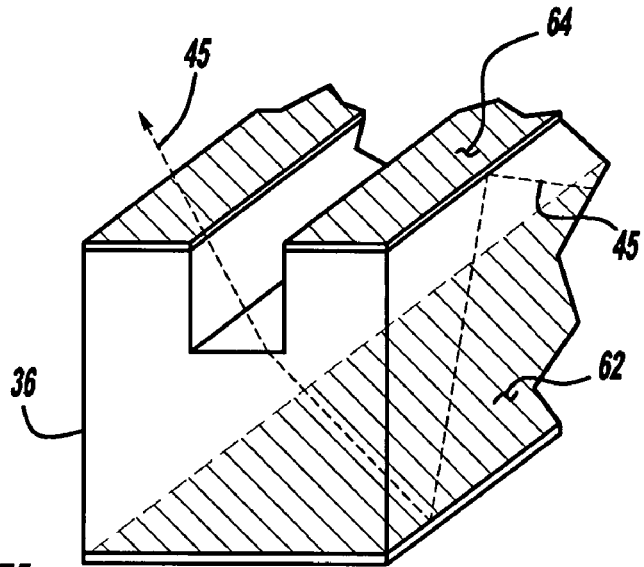

Referring now to FIG. 4a, a cross sectional view; FIG. 4b, a perspective view; and with continued reference to FIG. 3, a first embodiment of the pointer assembly 32 will be presented. The pointer assembly 32 may have a top surface 52 defining a channel 54, such that the top surface 52 defines a first land 56 and a second land 58, which may be coplanar or non-coplanar. The pointer assembly 32 may also have a bottom surface 60 to which an aluminum foil layer may be applied in a hot-stamping process. The layer upon the bottom surface 60 may be in a specific first color layer 62 material to reflect light through the pointer assembly 32. The color layer 62 not only retains light within the pointer by preventing its escape from the bottom of the pointer, but causes any light that is emitted from the top of the pointer to be more intense, as opposed to a top portion of the pointer that has a non-reflective surface below it. Specifically, in one example, the first color layer 62 may be white, and when coupled with the light 45 of an LED 47 that emits white light through a clear polycarbonate pointer 36, the light in the length of the pointer 36 remains purely white, whether it is reflected through the length of the pointer 36, or is refracted upward toward the lands 56, 58 as controlled by the configuration of the bottom surface of the shaft. As depicted in FIG. 4b, light 45 that is transmitted through the pointer 36 from the shaft 40, may reflect from various surfaces within the pointer 36 before escaping through the shaft or pointer top surface 64. Light may reflect from the bottom surface 62 and then escape from the top surface at lands 56, 58 where it may be seen as colored light by a viewer.

Continuing with reference to FIGS. 4a and 4b, the light 45 may pass out of the channel 54 where a viewer will see it as white light, a first color being emitted from the pointer assembly 32. As previously stated, the surface 64, and more specifically the lands 56, 58 may be applied with a colored layer, such as red, in a hot stamping process. Such hot stamping methods as applied to plastics such as polycarbonate and acrylic are generally known. Continuing, light 45 may scatter and continue to be reflected upward from within the pointer 36 and pass through the hot-stamped lands 56, 58 as light 53, 55. Because the light passes through the red colored lands 56, 58 they are seen as the second color, red. Therefore, a view of the top surface of the pointer 36 of FIG. 4a would show two stripes of red light 53, 55 flanking a single stripe of white light 45. The foil, or other colored, light passing layer on the lands may be controlled in density, thickness or other light passing property, to control the intensity or amount of light emitted from the lands 56, 58.

As presented above, the first and second lands 56, 58 may have a translucent foil layer of a second color 64 to emit a second light from the pointer assembly 32. Additionally, the translucent foil layer 64 of the first and second lands 56, 58 may also have reflective properties. While the first and second lands 56, 58 are being described as having the same color foil to reflect or emit the same color light from the pointer assembly 32, it is within the scope of the present invention to apply an alternate color foil to either the first or second land 56, 58 to reflect or emit a third color light through the pointer assembly 32. As an example, white light, as a first color, may be emitted from the channel 54, a second color may be emitted from the land 56 and a third color may be emitted from the land 58. It is also within the scope of the invention to apply a second layer of foil to any of the surfaces to obtain additional color properties, such as those colors that may only be achievable when light, such as white light, is passed through two layers of hot-stamped foil of different colors.

Turning now to the embodiment of FIG. 5a, a cross-sectional view, and FIG. 5b, a perspective view, a second embodiment of the pointer assembly 32 will be described. The pointer 36 of the pointer assembly 32 may have a first pointer zone 66 in a first color plastic and a second pointer zone 68 in a second color plastic. There may be a light-blocking material 70 between the first and second pointer zones 66, 68 to effectively block any interference of light between the zones thereby delivering crisp colors of light from the top surface of the pointer 36. The pointer assembly 32 may have a bottom surface 72 having a hot-stamped aluminum foil layer of a first color 74 to reflect light through the pointer 36 of the pointer assembly 32. The light source, such as LED 51, may transmit white light 49 to cause a first color light 67 to be emitted from the first pointer zone 66 and a second color light 69 to be emitted from the second pointer zone 68. It is also within the scope of the invention to separate the first pointer zone 66 into a third pointer zone in a third color plastic to cause the light source to emit a third color light from the third pointer zone.

Figure 5A:
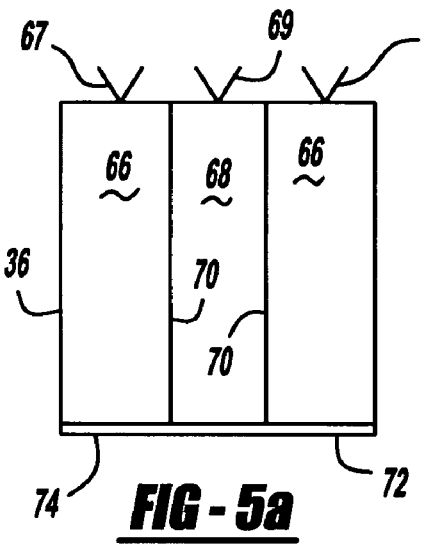
FIG. 5a is a cross-sectional view of a pointer in accordance with a second embodiment of the teachings of the present invention taken along line 5-5 of FIG. 2.
Figure 5B:
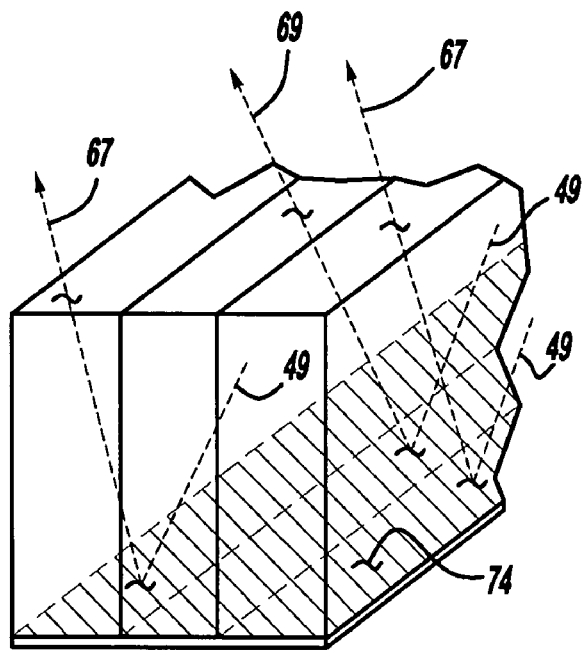

The embodiment depicted with FIGS. 5a and 5b, presents a different method of achieving a multiple color pointer. The tri-part zones 66, 68 of the embodiment may by individually molded as strips of plastic material and joined together in a joining process, such as with heat, an adhesive or both. Before such joining of the different molded-color plastic pieces, the light blocking layer 70 may be added between the pieces or zones.

Turning now to the embodiment depicted in FIG. 6a, a cross-sectional view, and FIG. 6b, a perspective view, a third embodiment of the pointer assembly 32 will be described. The third embodiment may be viewed as a variation of the first and second embodiments. The pointer assembly 32 may have a first pointer zone 76 in a first color plastic to emit a first color light 77 from the top of the pointer and a second pointer zone 78 in a second color plastic to emit a second color light 79 from the top surface of the pointer thereby resulting in a dual color pointer. There may be a light-blocking material 70 between the first and second pointer zones 76, 78, to prevent light of one color from being directed into a second color. The pointer assembly 32 may have a bottom surface 82 defining a channel 84, a first land 86 and a second land 88. The first and second lands 86, 88 may have a hot-stamped aluminum foil layer of a first color 90 to reflect light through the pointer assembly 32. As noted above, it is within the scope of the present invention to apply an alternate color foil to either the first or second land 86, 88 or to the channel 84 to reflect a third color light through the pointer assembly 32; to apply a second layer of foil to any of the surfaces to obtain additional color properties; or to divide the first pointer zone 76 into a third pointer zone in a third color plastic to cause the light source to emit a third color light from the third pointer zone.

Figure 6A:
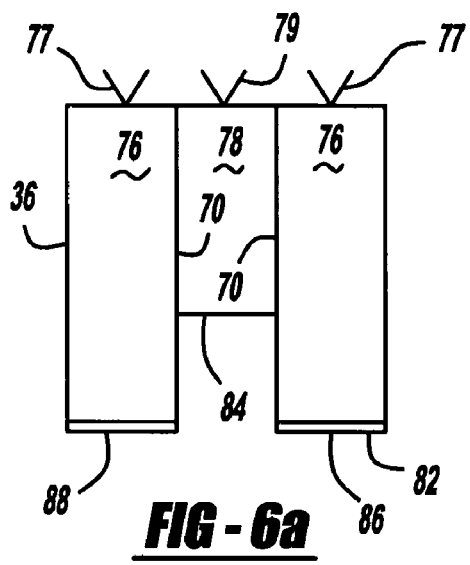
FIG. 6a is a cross-sectional view of a pointer in accordance with a third embodiment of the teachings of the present invention taken along line 6-6 of FIG. 2.
Figure 6B:
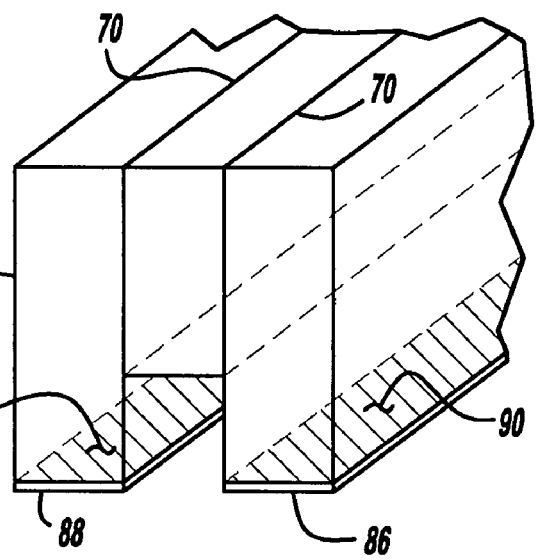

An advantage or characteristic of the embodiment depicted with FIGS. 6a and 6b is that by not placing a light reflecting material, such as a hot-stamped foil in the center portion or second pointer zone 78, the zone will pass less light than the adjacent zone 76 on either side of zone 78. Such low and high intensity light zones may make the pointer more or less readily observed in a quick glance by a driver driving at a high rate of speed. The selection of construction of a pointer in accordance with the three embodiments described above may depend upon the vehicle in which the pointer is installed, be it a large passenger car, truck or sports car. Also drivers of cars may fall into particular age categories and prefer, generally as a group, a pointer of a particular intensity of multiple color, or some variation thereof. Generally, each of the embodiments of FIGS. 4a/4b, 5a/5b and 6a/6b may provide different intensities of color zones in a dual, or triple, color pointer.

Additionally, an advantage of the teachings of the present invention is that a single light source, such as an LED, that emits a single color light, such as white light for example, may be used with a pointer, that when configured as explained above and depicted, will emit more than one color of light. Finally, different intensities of light from different zones of the pointer are achievable. For instance, by using a reflective material such as a reflective foil on a bottom surface of the pointer, light may be retained within a specific zone of the pointer and then emitted from the pointer as more intense light, as opposed to a zone that does not use a reflective material. Zones that do not use a reflective material or technique on the bottom of the pointer may permit light to escape from the bottom of the pointer and thus result in a less intensely illuminated pointer when the pointer is viewed from the top.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An indicating instrument comprising:
   a light source located at the lower assembly of the instrument;
   a face plate located above the light source; and
   a pointer assembly rotatably mounted through the face plate to indicate face plate positions and guides light from the light source to be visible at a pointer, the pointer assembly further comprising:
   the pointer;
   a top surface of the pointer defining a channel that is defined between a first land and a second land; and
   a bottom surface of the pointer having a reflective layer to reflect the guided light through the pointer, wherein the channel is formed by three walls of a single piece of a single material, wherein light from the light source is reflected through the pointer, off of the reflective surface of the bottom surface, through a wall forming the channel and into the channel, wherein at least some of the guided light reaches the pointer at an oblique angle and reflects and refracts against the internal surface of the pointer including the to and bottom surfaces and surfaces of the channel to reach a viewer.

2. The indicating instrument of claim 1, wherein the first land and the second land are formed on the single piece of the single material and have a first layer of a first color foil.

3. The indicating instrument of claim 2, wherein the reflective layer is a reflective foil.

4. The indicating instrument of claim 3, the first and second lands are co-planar on the solid structure of the single material.

5. The indicating instrument of claim 4, wherein the light source directs light directly into the pointer.

6. The indicating instrument of claim 5, further comprising:
   a motor, wherein the motor rotates the pointer assembly.

7. An indicating instrument comprising:
   a face plate;
   a light source located on a first side of the face plate;
   a hub; and
   a pointer extending from the hub, the pointer positioned on a second side of the face plate to receive light from the light source, the pointer further comprising:
   a reflective material applied to its bottom surface;
   a first pointer zone extending longitudinally from the hub for an entire length of the pointer in a first color plastic to cause the light source to emit a first color light from the first pointer zone;
   a second pointer zone extending longitudinally from the hub for an entire length of the pointer in a second color plastic to cause the light source to emit a second color light from the second pointer zone;
   a third pointer zone extending longitudinally from the hub for an entire length of the pointer in a third color plastic to cause the light source to emit a third color light from the third pointer zone;
   a first light-blocking material between the first and second pointer zones;
   a second light-blocking material between the second and third pointer zones, wherein the first light-blocking material and the second light-blocking material are perpendicular to the face plate; and
   an aluminum foil hot-stamp color layer on a bottom of two of the first pointer zone, second pointer zone and third pointer zone, wherein the aluminum foil hot-stamp color layer is perpendicular to each of the first light-blocking material and the second light-blocking material.

8. The indicating instrument of claim 7, further comprising:
a reflective material applied to a bottom surface of each of the first, second and third pointer zones.

9. An indicating instrument comprising:
a light source:
a face plate located above the light source; and
a pointer assembly rotatably mounted through the face plate to indicate face plate positions and guides light from the light source to be visible at a pointer, the pointer assembly further comprising:
the pointer;
a top surface of the pointer defining a channel that is between a first land and a second land; and
a bottom surface of the pointer having a reflective layer to reflect the guided light through the pointer, wherein the channel is formed by three walls of a single piece of a single material, wherein the pointer is a solid structure of the single piece of the single material, the channel is in the top surface for an entire length of the pointer, and light from the light source is reflected through the pointer, off of the reflective surface of the bottom surface, and through the first land and the second land.

* * * * *